Nov. 8, 1927.
O. WITTEL
1,648,525
CUT FILM ADAPTER FOR CAMERAS
Filed Feb. 17, 1926        3 Sheets-Sheet 1
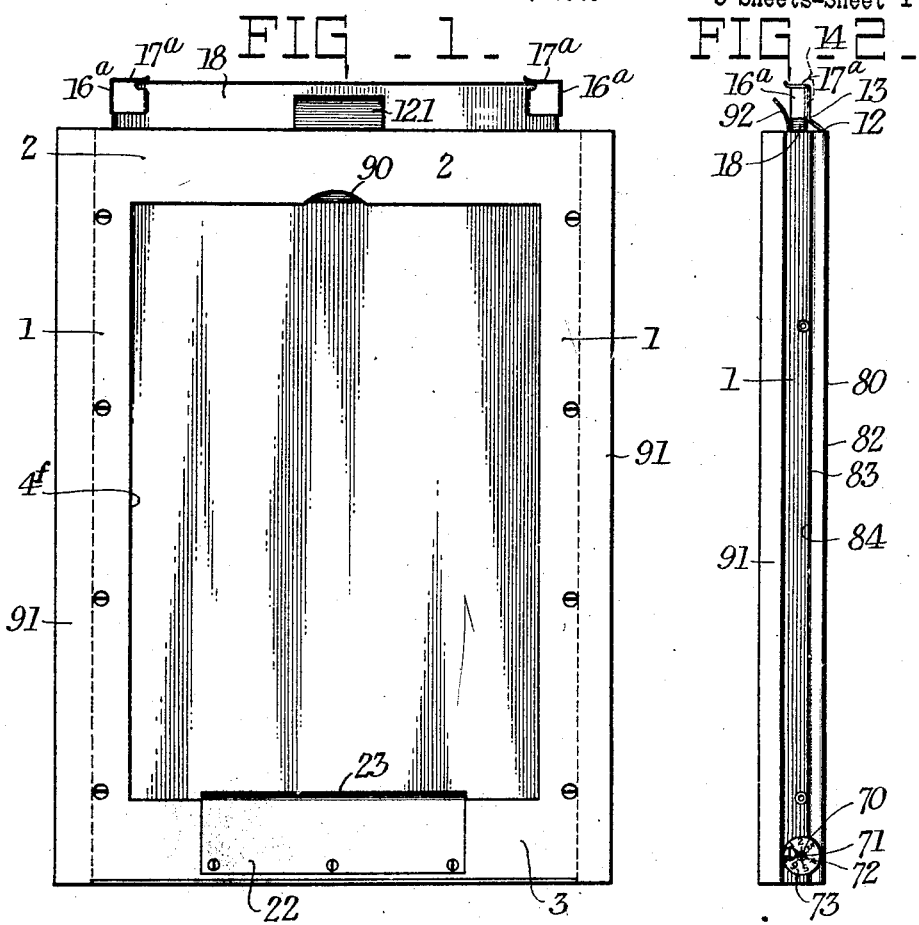
INVENTOR.
Otto Wittel,
BY
ATTORNEYS.

Nov. 8, 1927. 1,648,525
O. WITTEL
CUT FILM ADAPTER FOR CAMERAS
Filed Feb. 17, 1926   3 Sheets-Sheet 2
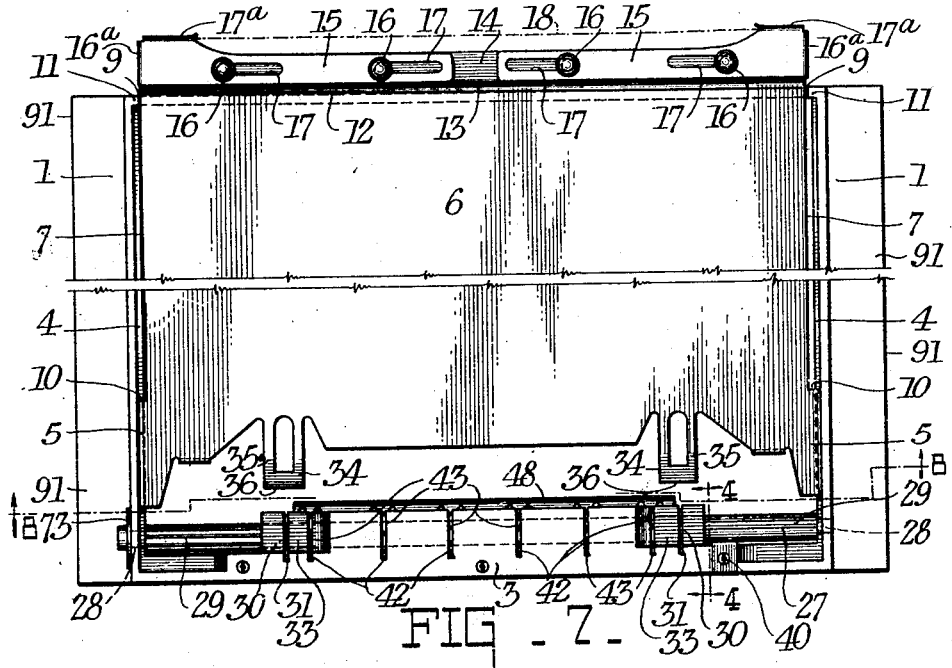
FIG_7_
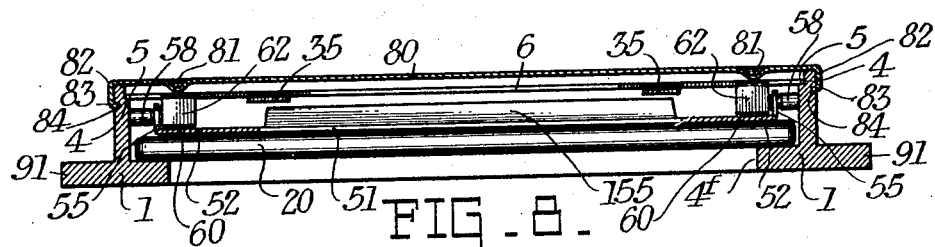
FIG_8_
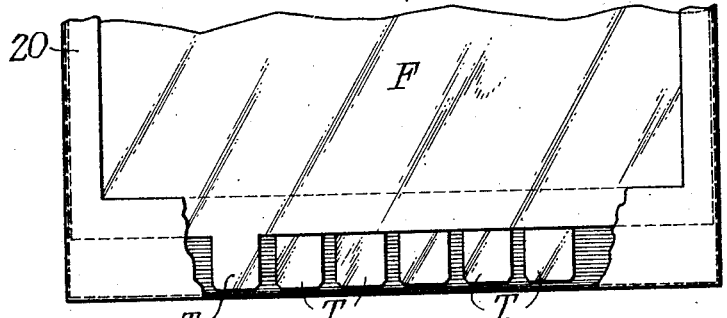
FIG_9_
INVENTOR.
Otto Wittel,
BY R. L. Stinchfield
his
ATTORNEYS.

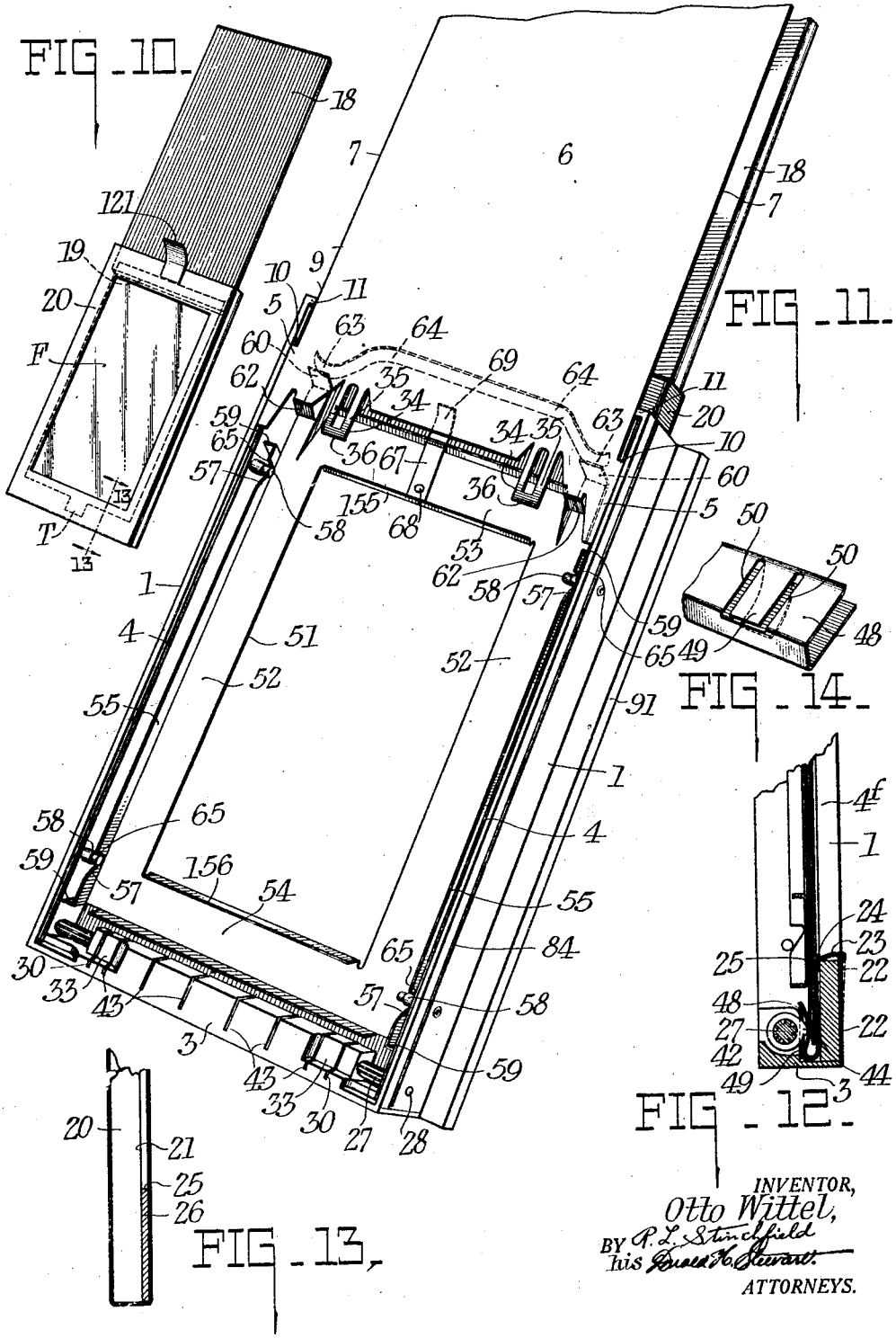

Patented Nov. 8, 1927.

1,648,525

UNITED STATES PATENT OFFICE.

OTTO WITTEL, OF ROCHESTER, NEW YORK, ASSIGNOR TO EASTMAN KODAK COMPANY, OF ROCHESTER, NEW YORK, A CORPORATION OF NEW YORK.

CUT-FILM ADAPTER FOR CAMERAS.

Application filed February 17, 1926. Serial No. 88,790.

This invention relates to photography and more particularly to photographic cut film holders. One object of my invention is to provide a holder for a plurality of relatively stiff cut films in which the films may be separately exposed. Another object is to provide a holder which tends to prevent more than one exposure on an individual film. Another object is to provide an automatic means for holding one film flat in the focal plane for exposure. Another object is to provide an automatic mechanism adapted to hold successive films in position for exposure. Another object is to provide an envelope engaging slide adapted to move all films excepting that positioned for exposure from the position in which they may be exposed. Another object is to provide an automatic film counter. Another object is to provide a retaining mechanism for the film frame which will hold this member in the adapter. Another object is to provide means for releasing the film frame for reloading, and other objects will appear from the following specification, the novel features being pointed out in the claims at the end thereof.

Coming now to the drawings wherein like reference characters denote like parts throughout:

Fig. 1 is a front elevation of a cut film adapter constructed in accordance with and illustrating one embodiment of my invention.

Fig. 2 is a side elevation of the adapter shown in Fig. 1.

Fig. 3 is an end elevation of the same adapter.

Fig. 4 is a fragmentary enlarged section on line 4—4 of Fig. 7.

Fig. 5 is an enlarged detail of the shaft operating star wheel.

Fig. 6 is an enlarged detail of a holding cam.

Fig. 7 is an enlarged plan view of my adapter with the back removed, part being broken away.

Fig. 8 is a section on line 8—8 of Fig. 7.

Fig. 9 is an enlarged plan view, broken away in part, of a film pack adapted for use in my adapter.

Fig. 10 is a perspective view of the film pack shown in Fig. 9 in an open or exposing position.

Fig. 11 is a perspective view of my adapter in a partially opened position, with the back removed, and with some parts omitted for the sake of clearness.

Fig. 12 is a fragmentary section showing parts of the adapter, particularly a holding cam, in an operative position.

Fig. 13 is a section on line 13—13 of Fig. 10 showing only the film pack case, and Fig. 14 is a fragmentary perspective detail of a spring used in connection with the holding cam.

This adapter consists broadly of a frame in which a pack of films may be placed and exposed one after the other. A slide movable into and out of the frame is the means for changing the films. A special film pack is used including a drawer and a frame to and from which the drawer is moved by the adapter slide. This film pack of itself forms no part of my invention.

As best shown in Fig. 1 my adapter consists of a body portion including a frame having side members 1, a top member 2 and a bottom member 3. The inner edge of the frame $4^f$ formed by these members, provides an exposure frame. The side members 1 of the frame, as shown in Fig. 7, are provided with rabbets 4 which provide slideways for the shoes 5 of the slide 6. The edges 7 of the slide are not as wide as the shoes and are adapted to slide through an opening 9 in the top rail 2. The shoulders 10 by striking lugs 11 limit the possible outward movement of the slide 6 from the adapter.

The top of the slide is bent at 12 forwardly (Fig. 2) and is again bent at 13 upwardly so as to provide a flat surface 14 upon which a pair of slides 15 (Fig. 7) are mounted through pin and slot connections 16 and 17. These sliding members have turned over ends $16^a$ provided with tops $17^a$ adapted to tightly engage one edge of the film pack drawer 18. Each time the drawer 18 is drawn to and from the position shown in Fig. 10, the slide 6 will be moved with the drawer.

The slide 6 is retained in the proper position with the members 5 in engagement with the rabbet 4 by means of the cover 80 (Fig. 8) which is provided with longitudinal ribs 81 which rest lightly upon the slide 6. The cover 80 is provided with side flanges 82 with turned in ends 83 adapted to engage the slots 84 of the side rails 1.

The film pack used with my adapter, as best shown in Figs. 9 and 10, may consist of a drawer 18 having an open end 19, said drawer being slidable to and from a light tight frame member 20. This frame is preferably made of relatively thin paper which may be easily collapsed. As shown in Fig. 13, there is preferably a relatively stiff cardboard front frame 21. The films F, which are preferably of the relatively stiff type known as "cut film" as shown in Fig. 9, are each provided with a tab T, these tabs being spaced differentially across the bottom of the frame. One film at a time may be retained in exposure position by squeezing or collapsing the frame 20 upon a tab T, thus holding the particular film to be exposed against movement when the drawer 18 is moved outward to the position shown in Fig. 10.

In order to hold the frame member 20 of the film pack against movement when the drawer 18 is moved outwardly, there is a spring latch 22, best shown in Figs. 1 and 12, attached to the bottom rail 3 of the adapter. This spring is bent at 23 inwardly and is provided with a nose 24 adapted to engage the cardboard frame 21 along the top 25 of the bottom portion 26 of the frame. In unloading a film pack from the adapter, the latch 22 is sprung out to the position shown in dotted lines in Fig. 12, thus permitting edge 25 of member 20 to slide past the latch.

In this adapter automatic means is provided for holding the individual films to retain them in an exposure position. The following mechanism is used for this purpose. As best shown in Fig. 7 there is an operating shaft 27 having trunnions 28 in the side rails 1, upon which the shaft is free to turn. This shaft is preferably made of extruded rod having a series of webs or flanges 29 extending through its length.

In order to turn the shaft 27 there are provided two star wheels 30 as best shown in Fig. 5, these star wheels being located in the slots 31 of the bottom rail 3. The star wheels each have a lug 31 adapted to engage in the slot between two flanges 29 of shaft 27. The arms 32 of the star wheel project above the reduced portions 33 of the bottom rail, so that they may be engaged by the latches 34 which are a part of slide 6. As indicated in Fig. 7, these latches are bent downwardly at 35. Each time the slide 6 is thrust in, the edges 36 of the latches strike teeth 32 of the star wheels 30 and turn shaft 27 a fraction of a revolution. Each time the slide 6 is withdrawn, the latches 34 ride up the inclines 37 so that the shaft is not turned. Shaft 27 is held against movement in one direction by the pawl 39, Fig. 4, which is attached at 40 to the bottom rail 3, and which is provided with a curved end 41 adapted to engage the ribs 29. Thus it will be seen that each in and outward movement of slide 6 will turn shaft 27 a distance equal to the space between two teeth of the star wheels 30.

The individual film tabs T may be held by the holding cams 42 in the following manner. A series of these holding cams are mounted in the slots 43 spaced a distance equal to the spacing of tabs T of the films, and located in the bottom rail 3, the holding cams all being alike but having the arms 44 spaced differently about the shaft 27, the arms being spaced by inserting the lugs 45 in successive slots 46 between the ribs 29 of shaft 27. Thus only one cam 44 at a time may be brought into the holding position shown in Fig. 12.

Beneath the shaft 27 there is a slot in which a spring member 48, best shown in Fig. 14, lies. This spring member is U-shaped in cross section and is made of spring metal. A series of spring tongues 49 are formed by making slots 50 in one of the U-shaped arms and the spacing of the tongues 49 is the same as that of the slots 43 in which the holding cams are located. Thus when the shaft 27 turns bringing an arm 44 of the holding cam in the contact with a spring tongue 49, this tongue is depressed collapsing the rear wall of the film pack, so as to firmly press a tab T against the stiff frame member 21. The drawer 18 may be then drawn out and the particular film F held by the holding cam will be retained in an exposure position.

For best results, the cut films should be held flat in the focal plane. The inner edge of the cardboard frame 21 is located at the focal plane of the camera and in order to hold the retained film flat against this frame, the following mechanism is employed. As best shown in Fig. 11, there is a frame 51 which I call the film flattening member and which includes the side rails 52, a top rail 53 and a bottom rail 54. The inner edges of rails 53 and 54 carry stiffening flanges 155 and 156 and the outer edges of the side rails 51 and 52 are provided with similar flanges 55, each of which is provided with a pair of cam surfaces 57 adapted to ride on pins 58 which are carried by the side rails 1 of the adapter. Each of the flanges 55 is also provided with an end lug 59 which lies close to the side rails 1 of the adapter and form guides so that the frame 51 will not move sideways in the frame.

To move the frame 51 to cam down a film into the focal plane, a pair of upstanding lugs 60 are provided along the upper edge of the frame and these lugs lie in the paths of the lugs 62 which are bent down from the slide member 6 and also in the paths of the ends 63 of a spring 64 attached to the inside of the top rail 2 of the adapter. When the slide 6 is drawn out nearly to its total extreme of movement, the lugs 62 engage lugs 60 so that the last part of the outward movement of slide 6 draws frame 51 outwardly and causes the cams 57, by riding on pins 58, to move frame 51 forwardly thrusting the film F firmly around all four edges against exposure frame 21 of the pack. The movement of frame 51 is comparatively little, less than one-quarter of an inch having been found satisfactory in practice.

As soon as the return movement of the slide 6 starts toward the adapter, the lugs 62 move from lugs 60 and the spring ends 63 by pressing on lugs 60 move the plate 51 towards its initial position. This movement is limited by the shoulders 65 of the flanges 55.

It is preferable, although not essential, to assist guiding the film pack into the holder when loading by means of a spring 67 which may be attached to frame 51 at 68 and which has a curved end 69 which thrusts the film pack between the frame 51 and the exposure frame 4.

Referring to Fig. 2, there may be a pointer 70 formed on the end 71 of the trunnion 28 which supports one end of shaft 27. Thus when the shaft is moved, the pointer will move opposite different graduations 72 on the fixed scale 73 and the number of exposures which has been made may be seen at a glance.

The adapter may be provided with any standard camera fitments,—in this case the rails 1 are provided with flanges 91 which may move in a standard slideway such as that provided on a number of cameras now on the market.

The operation of the above described adapter is as follows: To load a film pack into the adapter the slides 15 are moved to the opposite extreme of movement from that shown in Fig. 7, and the casing 20 with the drawer 18 lying inside thereof is thrust through an opening in the top rail 2 of the adapter frame. The pack is pushed down until the top of the drawer 18, which normally extends a short distance beyond the frame 20, is in position to be engaged by the spring clips 16a which are then moved towards each other to engage the corners of the drawer. The bottom of the film pack frame 25 becomes automatically engaged with the spring latch 23 as it is thrust into the frame.

The slide 6 is operated by moving it outwardly a short distance and then thrusting it inwardly again, thus turning shaft 27, and with it the holding cams 42, thereby bringing one cam into a holding position. The drawer 18 is then drawn out to position a film for exposure, the outward movement carrying with it the slide 6. When drawn to its outermost position, the frame 51 will have been cammed down to hold a retained film F flat in the focal plane of the camera. After making an exposure, the drawer 18 and with it the slide 6 are turned again into the adapter, this movement first permitting frame 51 to return to its initial position under the impulse of the spring end 63 and second, causing the latch members 36 to strike the star wheel 30 turning shaft 27 and thereby bringing a second holding cam 42 into engagement with a spring finger 49 which will press against the tab T of the next succeeding film. A series of exposures are thus made. The number of exposures may, of course, be varied by the size of the adapter and the number of holding cams. I find a six film pack, as shown, a very useful unit to use.

To unload a film pack from the adapter, the slides 15 are moved from the position shown in Fig. 7, the spring clip 22 is sprung out to the dash line position in Fig. 12 disengaging 24 from edge 25 and the cut out 90 may be used to start the film pack from the adapter or the handle 121 which is attached to the adapter body 20 may be used to withdraw the film pack, care being taken, of course, not to withdraw the drawer 18 during this operation.

With this device, a double exposure can not be made where the slide 6 is actuated after each time exposure. It is possible to leave one film unexposed by drawing the slide out a short distance and then returning it, but such operation is not likely to occur.

Having thus described my invention, what I claim as new and desire to secure by Letters Patent is:

1. In a film pack adapter, the combination with an exposure frame, of a plurality of film holding devices mounted on the frame, and means for operating the different holding devices one after another.

2. In a film pack adapter, the combination with an exposure frame, of a shaft, a plurality of film holding devices mounted on the shaft, and means for turning the shaft to operate the film holding devices.

3. In a film pack adapter, the combination with an exposure frame, of a shaft mounted thereon, a plurality of film holding cams carried by the shaft, a star wheel carried by the shaft, and means for operating the star wheel to turn the shaft.

4. In a film pack adapter, the combination with an exposure frame, of a shaft, a plurality of film holding devices mounted on the shaft, a shaft turning member mounted on the shaft, and a slidable member mounted on the exposure frame for engaging and operating the shaft turning device.

5. In a film pack adapter for use with a film pack including a frame and a film holding drawer, a slide movable to and from the adapter, and mechanism for attaching the film pack drawer to the slide whereby the slide and drawer may move together.

6. In a film pack adapter for use with a film pack including a frame and a film holding drawer, a slide movable to and from the adapter, and connections between the slide and the film pack drawer whereby movement of one will impart movement to the other.

7. In a film pack adapter for use with a film pack including a frame and a film holding drawer, a slide movable to and from the adapter, and movably mounted latching members adapted to attach the slide to the film pack drawer, said latches being adapted to engage an edge of the film pack drawer whereby movement of the drawer from the frame will cause movement of the slide.

8. In a film pack adapter for use with a film pack including a frame and a film holding drawer, a slide movable to and from the adapter, and spaced from the film pack drawer, and a connection between the ends of the slide and the film pack drawer for holding these two parts in a fixed relation.

9. In a film pack adapter for use with a film pack including a frame and a drawer, the combination with a film flattening member and a slide movable relative thereto, of means actuated by the slide for pressing the film flattening member toward the film.

10. In a film pack adapter for use with a film pack including a frame and a drawer, the combination with a film flattening member and a slide movable relative thereto, of parts carried by the film flattening member and the slide adapted to be engaged when the slide is moved to press the film towards the frame.

11. In a film pack adapter for use with a film pack including a frame and a drawer, the combination with a film flattening member, of cam connections between the flattening member and the adapter, and means for moving the flattening member upon the cam connection to thrust a film towards the frame, said means including a slide movable to and from the adapter.

12. In a film pack adapter for use with a film pack including a frame and a drawer, the combination with a film flattening member, of cams on the film flattening member, pins on the adapter cooperating with the cams, lugs on the film flattening member, a slide mounted in the adapter, and lugs on the slide adapted to engage the lugs on the flattening member, motion being transmitted from the slide to the film flattening member by engaging the lugs.

13. In a film pack adapter for use with a film pack including a frame and a drawer, the combination with a film flattening member, of cams on the film flattening member, pins on the adapter cooperating with the cams, a lug on the film flattening member, a slide having a lug adapted to engage the lug on the film flattening member, whereby the film flattening member may be moved upon its cams in one direction through the lugs, and means independent of the lugs for moving the film flattening member in an opposite direction.

14. In a film pack adapter adapted for use with a film pack having two relatively movable parts, the combination with an adapter body, of a slide movably mounted thereon, a film flattening device movably mounted therein, parts on the slide and flattener adapted to contact to move the flattener in one direction, and means independent of the slide for moving the flattener in an opposite direction.

15. In a film pack adapter adapted for use with a film pack including a pair of relatively movable parts, the combination with a body portion, of a slide cooperating therewith adapted to move a portion of the film pack, a plurality of film holders, and mechanism actuated by the slide for operating the film holders.

16. In a film pack adapter adapted for use with a film pack including a pair of relatively movable parts, the combination with a body portion, of a slide cooperating therewith adapted to move a portion of the film pack, a plurality of film holders, and mechanism actuated by the slide when moved in one direction for actuating the film holders.

17. In a film pack adapter adapted for use with a film pack including a pair of relatively movable parts, the combination with a body portion, of a slide cooperating therewith adapted to move a portion of the film pack, a plurality of film holders, and mechanism for moving the film holders including a member adapted to be engaged by the slide for moving the film holders.

18. In a film pack adapter adapted for use with a film pack including a pair of relatively movable parts, the combination with a body portion, of a slide cooperating therewith adapted to move a portion of the film pack, a plurality of film holders, and mechanism for moving the film holders including a member adapted to be engaged and moved by the slide when the slide is moved in one direction, said slide having a slip-off connection with the member when moved in the opposite direction.

19. In a film pack adapter adapted for use with a film pack including a pair of movable parts, the combination with a body portion, of a shaft mounted therein, a plurality of film holding members operatively connected to the shaft, means for moving a part of the film pack including a slide, and means for moving the shaft through movement of the slide, whereby the film holding members may be operated thereby.

20. In a film pack adapter adapted for use with a film pack having two relatively movable parts, the combination with a body portion, of a slide adapted to move with a portion of the film pack, a film flattener mounted in the body portion, and connections between the slide and the film flattener whereby the latter may be moved by the former.

21. In a film pack adapter adapted for use with a film pack having two relatively movable parts, the combination with a body portion, of a slide adapted to move with a portion of the film pack, a film flattener mounted in the body portion, and connections between the slide and the film flattener through which the film flattener may be moved through a portion of the movement of the slide when the slide is moved in one direction.

22. In a film pack adapter adapted for use with a film pack having two relatively movable parts, the movement of one part being adapted to uncover a film to permit the exposure of such film, the combination with a body portion, of a slide movable thereon with a portion of the film pack to uncover a film for exposure, a film flattener for pressing such film flat for exposure, and connections between the film flattener and the slide for operating the flattener as a film is uncovered.

23. In a film pack adapter adapted for use with a film pack including a frame and an envelope which may be moved to uncover a film in the frame, the combination with a body portion adapted to receive the film pack, a slide adapted to move in the pack, connections between the slide and the envelope whereby a film may be uncovered by moving the slide and envelope and means cooperating with the slide for holding the uncovered film flat.

24. In a film pack adapter adapted for use with a film pack including a frame and an envelope which may be moved to uncover a film in the frame, the combination with a body portion adapted to receive the film pack, a slide adapted to move in the pack, connections between the slide and the envelope whereby a film may be uncovered by moving the slide and envelope, a film flattener, and means carried thereby and cooperating with the slide adapted to move the film flattener to a position in which the film may be held flat, as the film is uncovered by the movement of the envelope.

25. In a film pack adapter adapted for use with a film pack including a frame and an envelope which may be moved to uncover a film in the frame, the combination with a body portion adapted to receive the film pack, a slide adapted to move in the pack, connections between the slide and the envelope whereby a film may be uncovered by moving the slide and envelope and means cooperating with the slide during a relatively small portion of its movement for holding the uncovered film flat.

26. In a film pack adapter, the combination with a body portion, of a slide movable therein to and from the body portion, a plurality of film holders mounted in the body, and means for successively actuating the film holders including the slide.

27. In a film pack adapter, the combination with a body portion, of a slide movable therein to and from the body portion, a plurality of film holders mounted in the body, adapted to move to and from an operative film holding position, means for moving the film holders and means cooperating with the slide for actuating the moving means by the slide.

28. In a film pack adapter, the combination with a body portion, of a slide movable therein to and from the body portion, a plurality of film holders mounted in the body, a common mount for all of the film holders, and a mount moving mechanism by which the film holders may be moved, and mechanism on the mount adapted to cooperate with the slide whereby movement of the latter may move successive film holders into a film holding position.

29. In a film pack adapter, the combination with a body portion, of a slide movable therein, film holders movably mounted thereon, being movable to and from an operative position in which they may hold a film, means including the slide for moving the holders to their operative positions, and to their inoperative positions.

30. In a film pack adapter adapted for use with film packs including an exposure frame, a body portion having an exposure frame thereon with which the film pack exposure frame may register and means carried by the body portion projecting through the exposure frame and adapted to engage an edge of the exposure frame of the film pack.

31. In a film pack adapter adapted for use with film packs including an exposure frame, a body portion having an exposure frame thereon and a spring latch carried by the body portion of the adapter adapted to engage an edge of the exposure frame of the film pack.

32. In a film pack adapter adapted for use with film packs including an exposure frame, a body portion having an exposure frame thereon and a spring member adapted to engage a portion of the film pack whereby the pack may be held in position in the holder.

33. In a film pack adapter adapted for use with film packs including an exposure frame, a body portion having an exposure frame thereon and a releasable member normally tending to move into engagement with a pack carried in the body portion of the adapter.

34. In a film pack adapter adapted for use with a film pack including a pair of relatively movable parts, the combination with a body portion adapted to hold a portion of the pack, of a slide adapted to engage and move with a movable portion of the pack, and means mounted on the body portion of the adapter for holding the other part of the pack against movement.

35. In a film pack adapter adapted for use with a film pack including a pair of relatively movable parts, the combination with a body portion adapted to hold a portion of the pack, of a slide adapted to engage and move with a movable portion of the pack, and a spring latch carried by the body portion and adapted to engage and hold a portion of the film pack when the latter is loaded into the body portion.

36. In a film pack adapter adapted for use with a film pack including a pair of relatively movable parts, the combination with a body portion adapted to hold a portion of the pack, of a slide adapted to engage and move with a movable portion of the pack, and a spring latch carried by the body portion and adapted to engage and hold a portion of the film pack, a portion of said spring latch projecting from the body portion whereby it may be manually moved to release the latch from holding engagement with the film pack.

Signed at Rochester, New York, this 12th day of February, 1926.

OTTO WITTEL.